US008117292B2

(12) United States Patent
Ishida et al.

(10) Patent No.: US 8,117,292 B2
(45) Date of Patent: Feb. 14, 2012

(54) SERVER FOR ROUTING CONNECTIONS BETWEEN THE SERVER AND A CLIENT MACHINE

(75) Inventors: Atsuki Ishida, Tokyo (JP); Nobuaki Tanaka, Tokyo (JP); Takafumi Kusano, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 621 days.

(21) Appl. No.: 10/536,945

(22) PCT Filed: Nov. 28, 2003

(86) PCT No.: PCT/JP03/15297
§ 371 (c)(1),
(2), (4) Date: Feb. 21, 2006

(87) PCT Pub. No.: WO2004/051947
PCT Pub. Date: Jun. 17, 2004

(65) Prior Publication Data
US 2006/0146837 A1    Jul. 6, 2006

(30) Foreign Application Priority Data

Nov. 29, 2002  (JP) ................................. 2002-348543
Jun. 5, 2003   (JP) ................................. 2003-161246
Oct. 3, 2003   (JP) ................................. 2003-345390

(51) Int. Cl.
*G06F 15/16*        (2006.01)
(52) U.S. Cl. ........................................ 709/223; 709/229
(58) Field of Classification Search .................. 709/229, 709/223
See application file for complete search history.

(56) References Cited

U.S. PATENT DOCUMENTS 6,118,784 A  *  9/2000   Tsuchiya et al. .............. 370/401
6,139,177 A  *  10/2000  Venkatraman et al. ......... 700/83
6,198,479 B1 *  3/2001   Humpleman et al. ........ 715/733
(Continued)

FOREIGN PATENT DOCUMENTS
CN           1361618 A        7/2002
(Continued)

OTHER PUBLICATIONS

K. Kobayashi et al. "Network Access Control for DHCP Environment", Nara Institute of Science and Technology, p. 1-7, http://web.archive.org/web/20010508101336/http://www.isoc.org/INET97/proceedings/F7/F7_3.HTM.*

(Continued)

*Primary Examiner* — Bunjob Jaroenchonwanit
(74) *Attorney, Agent, or Firm* — Haynes and Boone, LLP (57) ABSTRACT

The objective of the present invention is to provide an Internet connection system capable of bi-directional communications between the home network and the Internet by relatively simple means, enabling manufacturers of client-end home network appliances to create added values for users.

In order to attain the above objective, there is provided a method for connecting a client device and a server. The method is implemented on an Internet connection system, which has the client device, a relay device, and the server, the server being connected to the Internet and also to the client device through the relay device and the Internet. The method includes the steps of: (a) notifying the relay device of an IP address of the server; (b) enabling the relay device to establish a TCP/IP session by means of a tunneling connection between the relay device and the server by use of the IP address; and (c) enabling the relay device to route communications via the TCP/IP session from the server to the client device.

7 Claims, 9 Drawing Sheets

U.S. PATENT DOCUMENTS

| | | | |
|---|---|---|---|
| 6,523,696 B1* | 2/2003 | Saito et al. | 709/223 |
| 6,735,619 B1* | 5/2004 | Sawada | 709/212 |
| 6,957,275 B1* | 10/2005 | Sekiguchi | 709/245 |
| 7,349,967 B2* | 3/2008 | Wang | 709/227 |
| 7,600,025 B2* | 10/2009 | Lewin et al. | 709/226 |
| 2002/0065921 A1* | 5/2002 | Davidson et al. | 709/227 |
| 2002/0083191 A1* | 6/2002 | Ryuutou et al. | 709/237 |
| 2002/0103850 A1* | 8/2002 | Moyer et al. | 709/202 |
| 2004/0010561 A1* | 1/2004 | Kim et al. | 709/208 |
| 2004/0052257 A1* | 3/2004 | Abdo et al. | 370/392 |
| 2004/0054789 A1* | 3/2004 | Breh et al. | 709/229 |
| 2004/0240468 A1* | 12/2004 | Chin et al. | 370/466 |
| 2006/0259639 A1* | 11/2006 | Aken et al. | 709/245 |

FOREIGN PATENT DOCUMENTS

| | | |
|---|---|---|
| CN | 1363184 A | 8/2002 |
| JP | 10-178450 | 6/1998 |
| JP | 11-187061 A | 7/1999 |
| JP | 11187061 A | 7/1999 |
| JP | 2003-111170 A | 4/2003 |
| WO | 00/76130 A1 | 12/2000 |
| WO | WO 01/22683 A2 | 3/2001 |
| WO | WO 01/47248 A2 | 6/2001 |
| WO | 01/71977 A2 | 9/2001 |
| WO | 01/76146 A1 | 10/2001 |

OTHER PUBLICATIONS

A. Durand et al. "IPv6 Tunnel Broker", Network Working Group, Request for Comments: 3053, http://www.ietf.org/rfc/rfc3053.txt.*

Zhang, et al., "The Study of Network Security Technology Based on the Network Address Translator", Journal of Information Engineering University, Sep. 2001, vol. 2, No. 3, China Academic Journal Electronic Publishing House, China, 5 pages.

Malkin Gary Scott, "Dial-In Virtual Private Networks Using Layer 3 Tunneling", Proceedings of the Conference on Local Computer Networks, Nov. 2, 1997, pp. 555-561.

European Patent Office, Supplementary European Search Report, European Patent Application No. 03775977.6, dated Nov. 12, 2008, 2 pages.

Woodburn, R. et al., "A Scheme for Internet Encapsulation Protocol: Version 1", Network Working Group—Request for Comments: 1241, Jul. 2, 1991, 18 pages.

Atsushi, Kara et al., "Secure Remote Access from Office to Home", IEEE Communications Magazine, IEEE Service Center, Piscataway, US, vol. 39, No. 10, Oct. 1, 2001, pp. 68-72.

Japanese Patent Office, Official Action for Japanese Patent Application No. 2003-402147, dated Jan. 25, 2005, 2 pages.

* cited by examiner

| Domain Name (Home Network Name/Relay Device Name): | | | | | | |
|---|---|---|---|---|---|---|
| Terminal Name | Owner | State | Equipment Type | Model Number | | |
| 1 | Father | Power ON | VCR | XX1 | Operation Screen | 45 |
| 2 | Father | Power ON | TV | YY2 | Operation Screen | 45 |
| 3 | Father | Power OFF | PC | SS3 | Operation Screen | 45 |
| 4 | Father | Power ON | Camera | FF4 | Operation Screen | 45 |

FIG. 8

Search Interface 43

Domain Information
Domain Name (Home Network Name/Relay Device Name):

Location:

44

Terminal Information
State Information
Model Information
Type Information

Start Search    Cancel

SERVER FOR ROUTING CONNECTIONS BETWEEN THE SERVER AND A CLIENT MACHINE

CROSS REFERENCE TO RELATED APPLICATIONS

The present application claims priority under Article 4 of the Paris Convention (and corresponding stipulations of other countries) based upon Japanese patent application No. 2002-348543, Japanese patent application No. 2003-161246 and Japanese patent application No. 2003-345390. The entire disclosure of the aforesaid applications is incorporated herein by reference.

FIELD OF THE INVENTION

The present invention relates to a method of connecting client devices and a server, and to the server and network-enabled home appliances used in this method. Bi-directional communications are made possible between a home network and the Internet by relatively simple means under the current infrastructure environment with IPv4 (Internet Protocol version 4).

BACKGROUND OF THE INVENTION

In a service-delivery environment through Internet-centered public networks, values of all information are generally located on a server side rather than a client side.

Each client (terminal device) is basically a viewer, which browses information on the Internet. Each client issues various requests to obtain information from the Internet, which in return sends back information for the client. It means that all information is collected on the Internet, which offers formulaic information single-directionally. For this reason, it is difficult for manufacturers of client terminal devices to create added values for users.

In order to change this circumstance, the server-client relationship must be reversed by inverting the access direction. For a home network connected to the Internet, for example, an environment must be created such that access from the Internet to the home network is initiated, and services are provided by the home network to the Internet.

To achieve this, the internet network needs to be able to uniquely identify each device connected to the home network. Home routing and security problems need also to be resolved. One of the technologies to address this issue is IPv6 (Internet Protocol version 6).

However, in view of the circumstances regarding the current Japanese carriers and Internet service providers, it can be surmised that a considerable amount of time will have to be expended until the IPv6 becomes widely available. For example, it will take at least 2 to 3 years for the currently available IPv4 to depreciate, and the IPv6 service has just started on a test basis.

In order to achieve an IPv6-enabled network quickly, manufacturers will need to expand their business to include ISP level services, which is very costly and unrealistic. Furthermore, home network environments vary tremendously with their connection mechanisms varying widely depending on their carriers and ISP's. Therefore, a new, standardized approach is needed to realize the IPv6 environment by taking into account all these variations.

An example of prior art literature dealing with the above circumstances is JP-A-2001-274845. Although this prior art is cited herein, the novelty and inventive step of the invention according to the present application are not meant to be rendered moot.

When attempting to achieve the bi-directional access between the home network and the Internet using the IPv6 network in the conventional IPv4 environment, the following problems arise.

In the current IPv4 environment, for example, when installing a network home appliance at home, it has to be connected through the home network to a router connected to the Internet. In this case the IP address of the network home appliance becomes a private address and cannot be accessed from any network other than this particular home network.

Thus, conventionally, the access to a network home appliance has been achieved by employing a dedicated router capable of controlling the network home appliance, or by using a data center provided on the Internet to accumulate information for controlling the network home appliance and retrieving the information by polling from the network home appliance.

However, for the case of using the dedicated router, its versatility decreases and cost increases. For the case of retrieving the control information by polling, the access cannot be made real time, and the network and server load increases.

In view of the above circumstances, the objective of the present invention is to provide an Internet connection system capable of bi-directional communications between the home network and the Internet by relatively simple means, enabling manufacturers of client-side network home appliances to create added values for users.

SUMMARY OF THE INVENTION

In order to attain the above objective, according to a first main aspect of the present invention, there is provided a method for connecting a client device and a server, the method implemented on an Internet connection system which comprises the client device, a relay device, and the server, the server being connected to Internet and also to the client device through the relay device and the Internet, comprising the steps of: (a) notifying the relay device of an IP address of the server; (b) enabling the relay device to establish a TCP/IP session by means of a tunneling connection between the relay device and the server by use of the IP address; and (c) enabling the relay device to route communications via the TCP/IP session from the server to the client device.

According to such a structure, all communications related to the client device such as a network home appliance are performed through the server on the Internet regardless of their carriers and ISP's, enabling the server owners to freely configure and control network home appliances and servers on their home or workplace network. Thus all problems related to conventional home routing, security and individual identification of the client device in a private network from servers on the Internet can be solved, and extremely open and yet closed networks can be realized.

According to one embodiment of the present invention, the relay device is each installed in each client device.

According to another embodiment, in the step (a), the relay device connects to a tunneling broker server provided on the Internet, and receives the IP address of the server from the tunneling broker server.

According to yet another embodiment, the step (b) comprises the steps of: (b-1) enabling the relay device to connect to the server by use of the IP address of the server; (b-2) enabling the server to notify the relay device of an IP address of the relay device for establishing the TCP/IP session by means of the tunneling connection; and (b-3) establishing the TCP/IP session by means of the tunneling connection between the server and the relay device. In this case, the step (b-1) preferably comprises the step of enabling the server to perform connection authentication for the relay device; and the step (b-2) preferably comprises the step of generating the IP address of the relay device depending on a result of the connection authentication.

According to a second main aspect of the present invention, there is provided a network-enabled home appliance, comprising: a control section for receiving a packet, the packet including a predetermined command, and controlling the network-enabled home appliance based on the command; a server address storage section for storing a global address of a server located on the Internet; a tunneling establishing section for establishing a tunneling connection between the network-enabled home appliance and the server based on the global address of the server; and a packet processing device for capsulating/decapsulating packets, the packets communicated with the server through the tunneling connection, and routing the packets to the control section or the server.

The network-enabled home appliance preferably further comprises: a broker server address storage section for storing an address of a tunneling broker server located on the Internet; and a server address obtaining section for accessing the tunneling broker server based on the address of the tunneling broker server, and receiving the global address of the server from the tunneling broker server.

According to such a structure, all communications related to the network-enabled home appliance are performed through the server on the Internet regardless of their carriers and ISP's, enabling the server owners to freely configure and control network home appliances and servers on their home or workplace network. Thus all problems related to conventional home routing, security and individual identification of the network-enabled equipment in the private network from servers on the Internet can be solved, and extremely open and yet closed networks can be realized.

Further, according to a third main aspect of the present invention, there is provided a server used on an Internet connection system which comprises a client device, a relay device, and the server, the server being connected to Internet and also to the client device through the relay device and the Internet, comprising: a tunneling establishing section for establishing a tunneling connection to the relay device; a client device management device for managing the client device in association with the relay device or the tunneling connection; and a routing device for routing a connection, the connection from the Internet to the client device, through the tunneling connection to the relay device which is connected to the client device, based on management at the client device management device.

According to such a structure, all communications related to the network-enabled home appliance are performed through the server regardless of their carriers and ISP's, enabling the server owners to freely configure and control network home appliances and servers on their home or workplace network. Thus all problems related to conventional home routing, security and individual identification of the network-enabled equipment in the private network from servers on the Internet can be solved, and extremely open and yet closed networks can be realized.

According to one embodiment of the present invention, the server further comprises: a model identification section for determining if the client device is of a predetermined model and/or if the relay device is of a predetermined model; and a command conversion section for converting a command to be sent to the client device to a command in a predetermined format for controlling the client device, based on results from the model identification section. In this case, the server preferably comprises: a model identification section for determining if the client device is of a predetermined model and/or if the relay device is of a predetermined model; and a command conversion section for converting a command to be sent to the client device to a command in a predetermined format for controlling the client device, based on results from the model identification section. Preferably, the server further comprises a communication session disconnection section for disconnecting communication sessions or limiting packet transmissions if the model identification section determines that the client device or the relay device is not of the predetermined model.

According to another embodiment of the present invention, the client device includes peripheral equipment, which is communicable with the relay device but cannot independently connect to the Internet.

According to yet another embodiment of the present invention, the server further comprises a network type identification section for determining if a first network environment connected with the client device and/or the relay device is of a predetermined type. In this case, the server preferably further comprises a communication session disconnection section for disconnecting communication sessions or limiting packet transmissions if a private network environment connected to the client device or the relay device is determined not of the predetermined type.

According to yet another embodiment of the present invention, the server further comprises a state information obtaining section for obtaining at least one of an operation state, a usage state and location information of the client device and/or the relay device.

According to such a structure, all communications related to the client device such as a network home appliance are performed through the server on the Internet regardless of their carriers and ISP's, enabling the server owners to freely configure and control network home appliances and servers on their home or workplace network. Thus all problems related to conventional home routing, security and individual identification of the client device in a private network from servers on the Internet can be solved, and extremely open and yet closed networks can be realized.

Other characteristics and marked effects of the present invention will become apparent to those skilled in the art upon referring to explanations of the following DETAILED DESCRIPTION OF THE PREFERRED EMBODIMENTS when taken in conjunction with the accompanying drawings.

DETAILED DESCRIPTION OF THE PREFERRED EMBODIMENTS

Embodiments of the present invention are described below with reference to the accompanying drawings.

Figure 1:
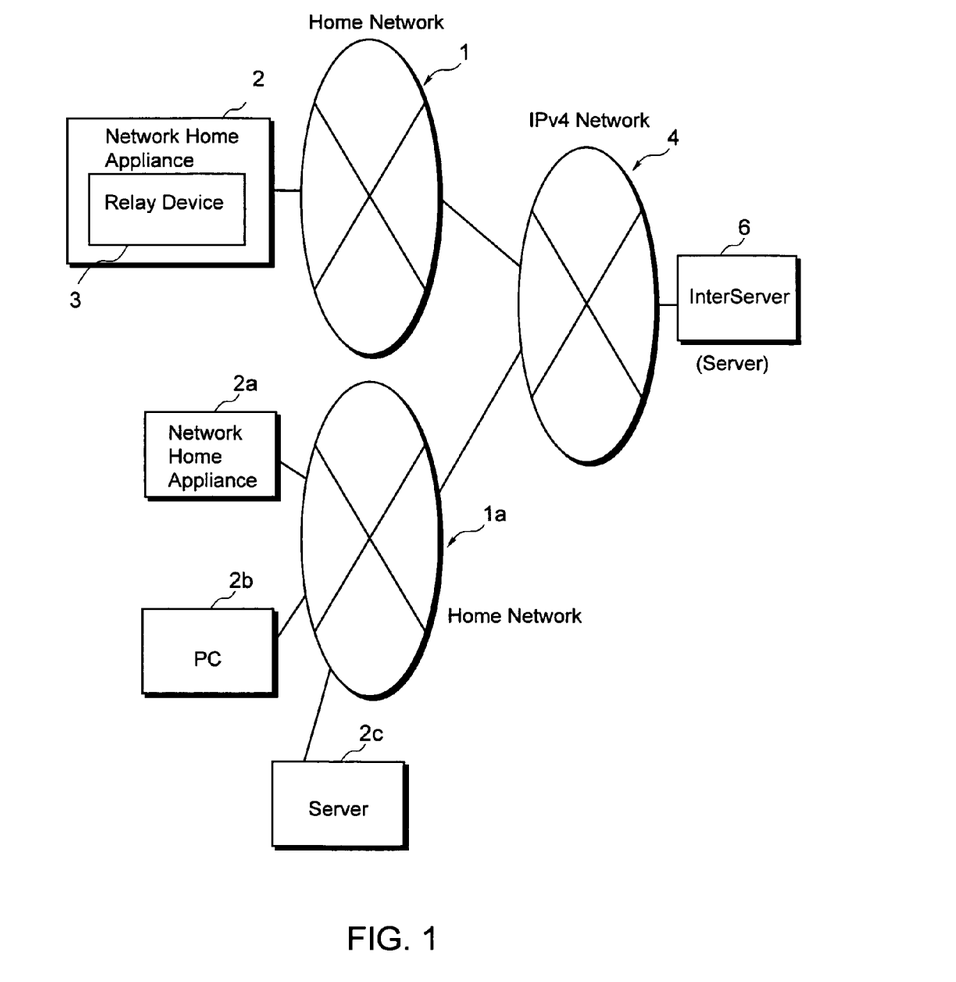
FIG. 1 is a diagram showing an example of a network structure according to one embodiment of the present invention.

FIG. 1 is a diagram showing an example of the network structure according to one embodiment. Indicated with a reference numeral 1 in this figure is a home network connected to a client network home appliance 2 (hereafter, referred to as a "network home appliance") communicating with IPv4 (with a first communication protocol). The home network 1 is, for example, structured using a LAN implemented in each home. Also a relay device 3 according to the present invention is installed in each network home appliance 2.

The home network 1 is connected to an Internet network (an IPv4 network 4), via a communication carrier/ISP. In the IPv4 network 4, communications are performed using IPv4 (with a second communication protocol).

Connected to the IPv4 network 4 is an InterServer 6 (a server according to the present invention) for controlling communications of the network home appliance 2 on the home network 1. As described in greater detail herein below, the InterServer 6 has broker functions for connecting the network home appliance 2 to a network home appliance 2*a*, a personal computer 2*b*, and a server 2*c* on a home network 1*a* or any other home/global network as well as on the IPv4 network 4.

Here, the relay device 3 and the InterServer 6 are intended to be manufactured by the same manufacturer or under a unified standard, and are designed to interface with each other. As described below, the relay device 3 is provided with a private address of the InterServer 6 with IPv4, so that a TCP/IP session via a tunneling connection may be established at the InterServer 6 to enable communications regardless of its carrier or ISP. Additionally the network home appliance 2 connected to the home network 1 is also intended to be manufactured by the same manufacturer as that of the relay device 3, or manufactured under a unified standard. Furthermore, an IP address of the relay device 3 is uniquely generated based on the model or other attributes of the network home appliance 2.

Note that the network home appliance 2 may be a conventional home appliance such as a VCR or a TV, which itself cannot connect to the Internet. In this case, the relay device 3 and the network home appliance 2 may be connected through a predetermined communication interface (IEEE1394), and a virtual IP address may be assigned to each home appliance 2 as an ID (unique ID).

Figure 2:
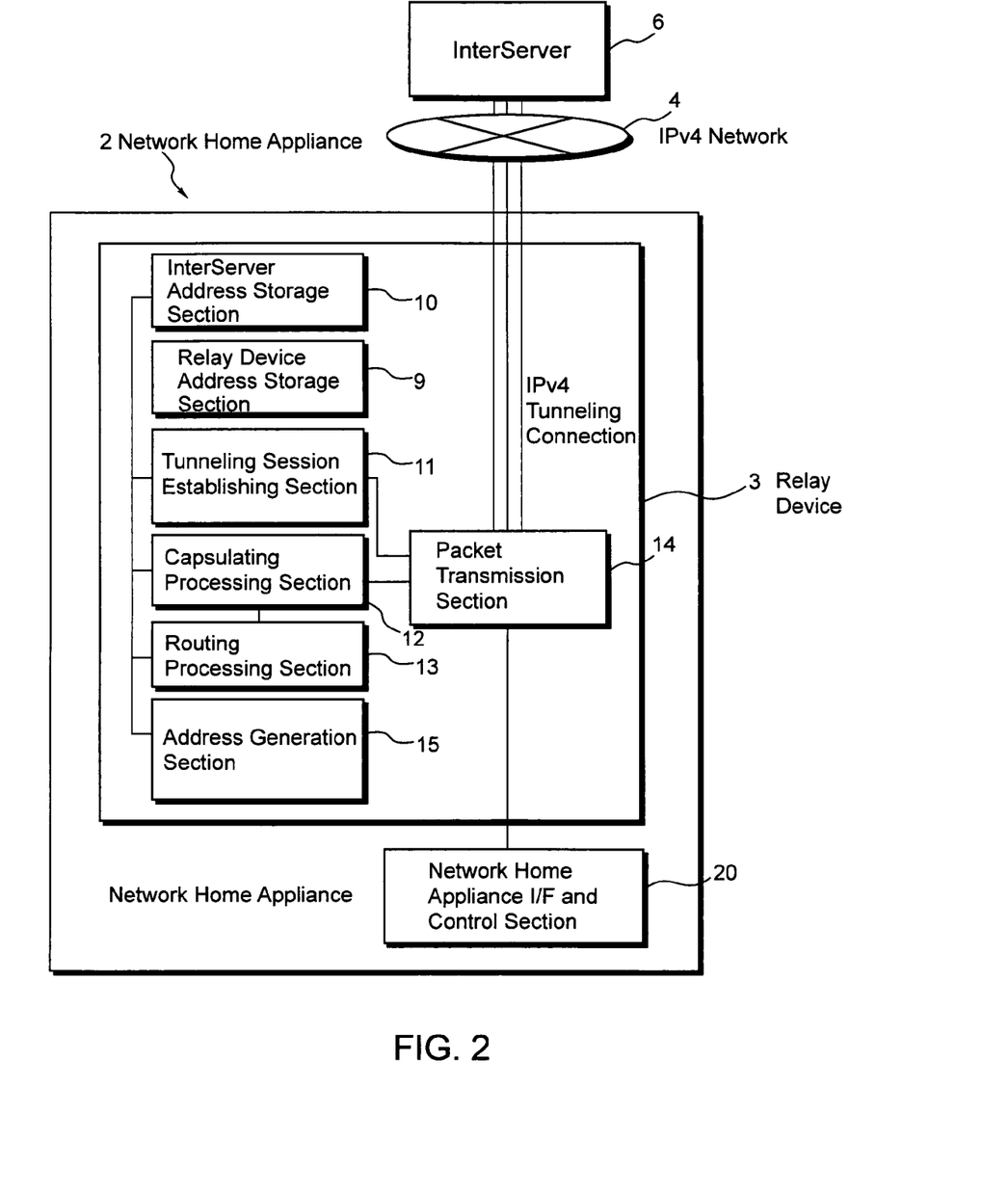
FIG. 2 is a schematic structural view showing an example of a relay device according to one embodiment of the present invention.

FIG. 2 is a schematic structural view showing the network home appliance 2 and the relay device 3.

The relay device 3 has an InterServer address storage section 10 for storing a global address of the InterServer 6 with IPv4; a relay device address storage section 9 for storing a private address assigned to the relay device 3 with IPv4; a tunneling session establishing section 11 for establishing a tunneling connection with the InterServer 6 based on the InterServer 6's address; a capsulating processing section 12 for capsulating/decapsulating IPv4 packets using IPv4, and performing tunneling transmission between the InterServer 6 and a network home appliance I/F and control section 20; a routing processing section 13 for routing the decapsulated packets from the InterServer 6 to the network home appliance 2; and a packet transmission section 14 for transmitting the packets. Also the relay device 3 is provided with an address generation section 15 for generating an address for the network home appliance 2.

According to such a structure, packets to or from the network home appliance 2 can be transmitted through a tunnel established with IPv4 between the InterServer 6 and the relay device 3.

Figure 3A:
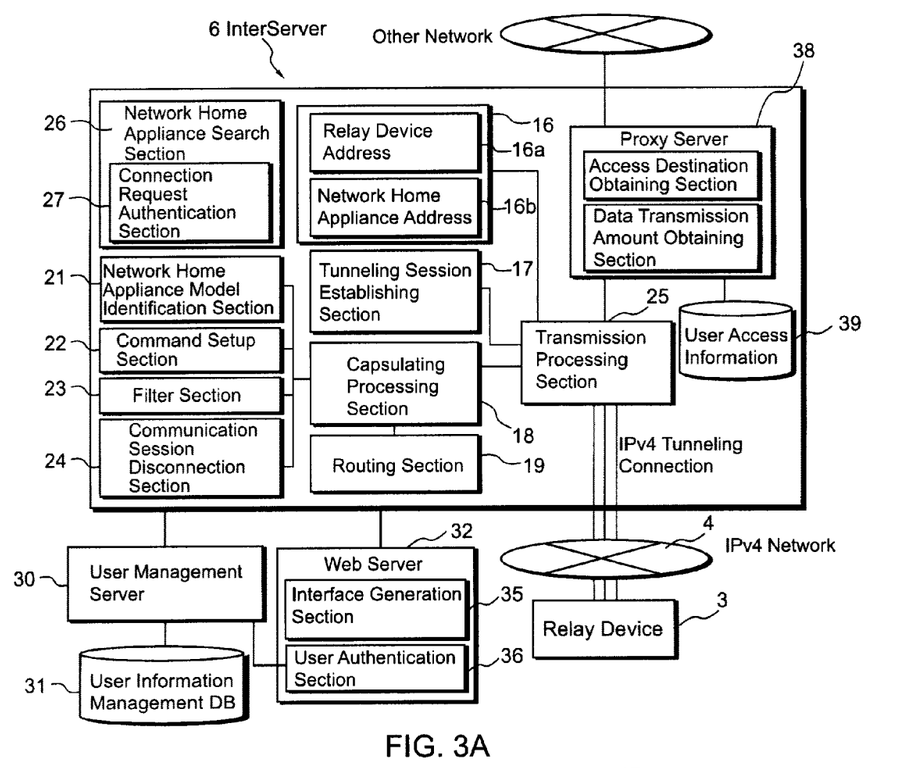
FIG. 3A is a schematic structural view showing an example of an InterServer according to one embodiment of the present invention.

FIG. 3A is a schematic structural view showing the InterServer 6.

The InterServer 6 has an address storage section 16 (client device management device) for associating and storing a private address of the relay device 3 with IPv4 (a relay device address 16*a*) which is the information for identifying a tunneling session, and a global address of the client device with IPv6 (a network home appliance address 16*b*); a tunneling session establishing section 17 for establishing a tunneling connection with the relay device 3 based on the address of the relay device 3; a capsulating processing section 18 for capsulating/decapsulating the IPv4 packets using IPv4 to thereby enable communications with the network home appliance 2; and a routing section 19 for routing communications between the network home appliance 2 and other terminals and servers. In addition, the InterServer 6 has a network home appliance model identification section 21 for determining the model of the network home appliance 2 based on the IPv4 address of the network home appliance 2 or the relay device 3; a command setup section 22 for converting a command to be sent to the network home appliance 2 to a predetermined command and setting it based on the result from the network home appliance model identification section 21; a filter section 23 for filtering the tunnel-transmitted IPv4 packets using predetermined rules; and a communication session disconnection section 24 for disconnecting communication sessions in predetermined cases. Packet transmission is performed by a transmission processing section 25.

Further, the InterServer 6 is connected to a user management server 30. As discussed in detail below, the user management server 30 manages user information for each relay device 3 or each network home appliance 2, and has a user information management DB 31 for storing the member information of each user, such as ID, password and billing information, as well as model and network information and the like.

Figure 3B:
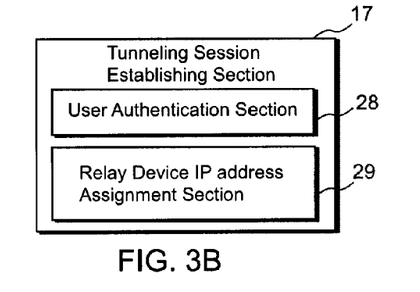
FIG. 3B is a schematic structural view showing an example of a tunneling session establishing section according to one embodiment of the present invention.

The information stored in the user management DB 31 is utilized when the tunneling session establishing section 17 establishes a tunneling session. As shown in FIG. 3B, the tunneling session establishing section 17 is further provided with a user authentication section 28 for authenticating each user based on the user information; and a relay device IP address assignment section 29 for assigning an IPv4 private address to the relay device 3 to establish the tunneling session. In the case of IPv4, any address scheme may be used for an IP address assigned to each relay device; for example, a private address such as 10.xxx.xxx.xxx may be assigned. This may be generated according to predetermined rules depending on the user, model or network information mentioned above. It should be noted that a method of generating an address for the relay device 3 is not limited to the above scheme.

Moreover, the InterServer 6 has a Web server 32, which is open to public on the Internet (IPv4 network 4), and receives requests from a user of the relay device 3 or the network home appliance 2 to allow the user to configure various settings. For example, at least some of the filtering rules applied at the filter section 23 may be changed by the user via the Web server 32. Note that the Web server 32 may be accessed through the relay device 3 and the InterServer 6 or through the IPv4 network 4.

Figure 4:
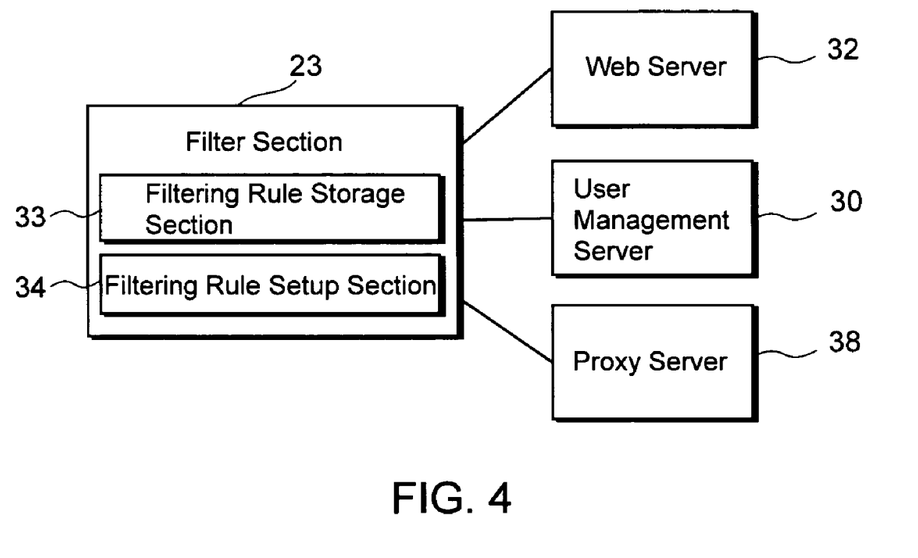
FIG. 4 is a diagram showing a schematic structure of a filter section.

As shown in FIG. 4, the filter section 23 has a filtering rule storage section 33 and a filtering rule setup section 34. The filtering rule storage section 33 and the filtering rule setup section 34 are connected to the Web server 32, which is open to public on the Internet (IPv4 network 4) and is installed with an interface generation section 35 for interacting with the InterServer, as shown in FIG. 3A. A user connected to the Web server 32 can enter or change the filtering rules by displaying on the user's terminal an interface generated by the interface generation section 35. Possible filtering rules which may be configured here include, for example, ones related to security.

Purposes of the security filtering rules are possibly to: (1) deny all access attempts to the home network from outside; (2) deny all access attempts to the home network from outside except from pre-approved servers (Web sites) and networks; and (3) allow access to the home network from outside without restriction. Thus, the filtering method may allow only specific ports or may deny all access attempts.

Additionally, access from the home network 1 to preset external servers may be restricted to, for example, prevent children from accessing harmful contents and to generally prevent users from accessing fraudulent Web sites.

These filtering rules may be configured after ID and password authentication by a user authentication section 36, which is provided in the Web server 32 and connectable to the user management server 30 as shown in FIG. 3A.

The filtering rule setup section 34, which configures the filtering rules based on the user entry as described above, also has a function to generate the filtering rules automatically based on the member information (such as billing and terminal model information) stored in the user management server 30 without using the user entry. For example, the filtering rules may be configured as a gateway to, for example, allow no connections or allow access only to specific servers depending on the user's attributes and membership dues payment status.

These filtering rules as a gateway may be used to control vendors which provide a fee-based business via the InterServer 6. For example, the InterServer 6 may be provided with a proxy server 38, as shown in FIG. 3A, for storing addresses a user accesses in a database (user access information 39) and managing them to thereby allow the user to connect only to those addresses preset in the filtering rule setup section 34. In this case, it is preferred to implement a function to recognize which services the user uses and terms of each service contract in addition to the user ID and password in the user information management DB 31, and control transactions according to the terms. For specific vendors, only samples, but not the true screens, may be displayed to users who have not completed a registration procedure.

Figure 5:
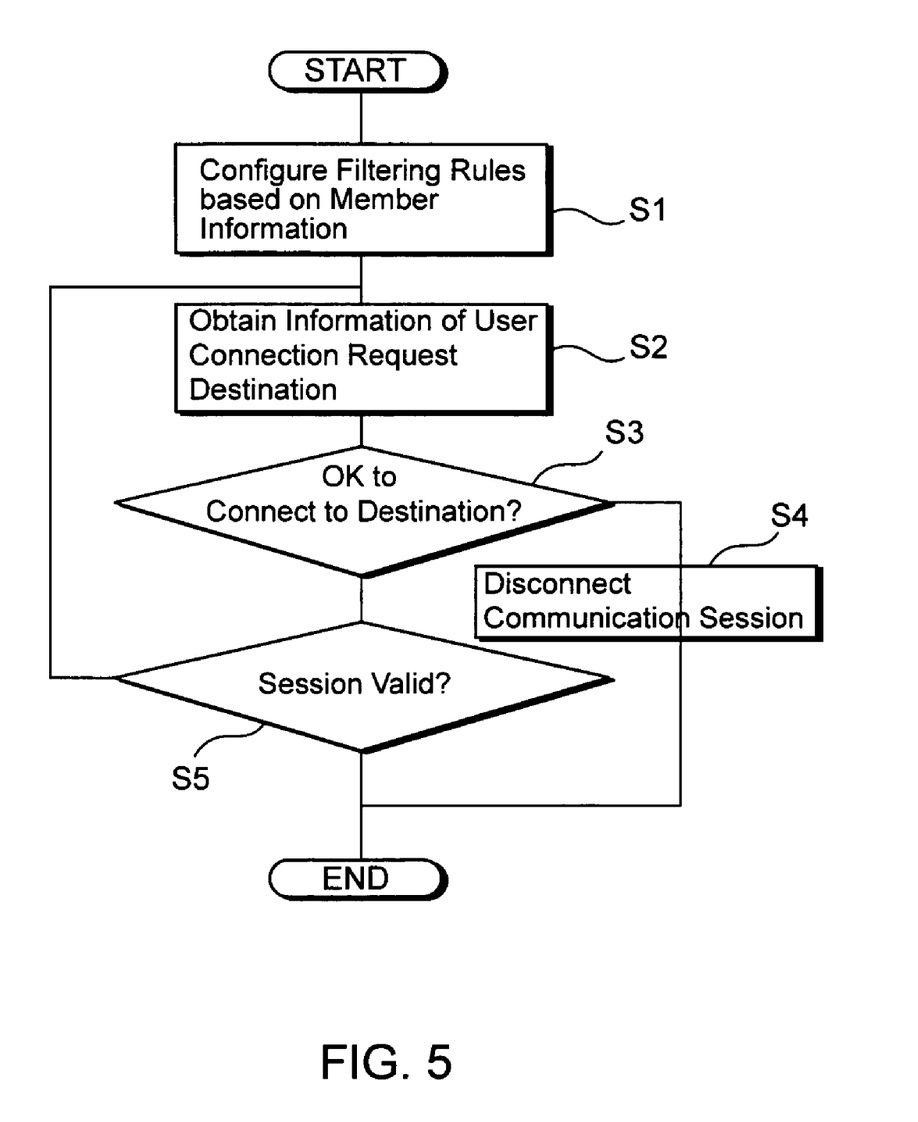
FIG. 5 is a flowchart showing processing at the filter section.

FIG. 5 is a flowchart showing processing at the filter section 23. First, when a tunneling session is started, the filter section 23 configures the filtering rules based on the member information received from the user management server 30 (step S1). Next it receives information of the destination to which the user requested connection (for example, a Web site address) from the proxy server 38 (step S2). Then the filter section 23 applies the filtering rules to the connection destination information, determines whether or not the access should be permitted (step S3), and disconnects the communication session through the communication session disconnection section 24 if the connection is not permitted (step S4). If the connection is permitted, the filter section 23 determines if the session is still valid (step S5). If so, the processing of the steps S2-S5 is repeated. If the session is no longer valid, the processing is terminated.

Also the proxy server 38 may measure the amount of data transmitted so that it can deny access from users who have not paid their bills. In this case, the vendor may be informed of the ID's, but not the passwords or IP addresses of those users. Thus, the user should simply manage a pair of ID and password for the InterServer 6. It is appropriate to check the ID as a key each time for system consistency since the IP address may be changed for the user's convenience or other reasons and since there may be a risk of data obtained at the vendor side being used for malicious access.

Implementation of the filtering rules, and disconnection and connection of communication sessions based on these rules are performed by the communication session disconnection section 24. Incidentally, filtering methods, gateway methods, and other methods using the configured filtering rules are publicly known and therefore omitted herein.

The InterServer 6 has a network home appliance search section 26 (FIG. 3A) for providing users who do not know the address of the network home appliance 2 with an ability to find the network home appliance 2. The network home appliance search section 26 searches for and identifies a desired network home appliance 2 based on user-specified information, for example, the operation state of the network home appliance 2 and the network.

Figure 6:
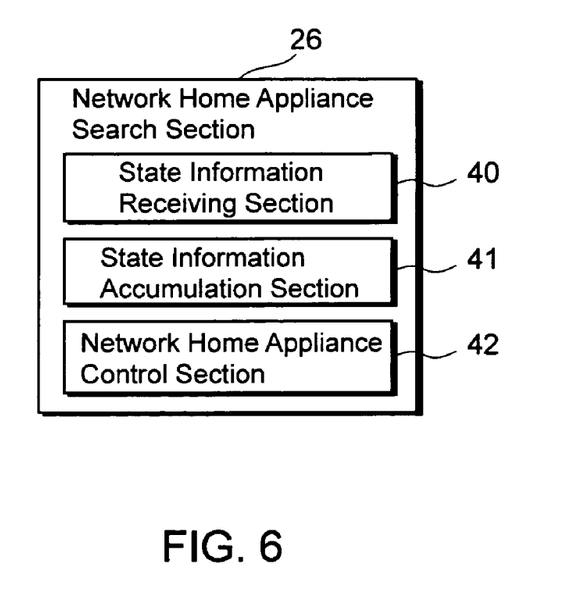
FIG. 6 is a diagram showing a schematic structure of a network home appliance search section.

To do this, as shown in FIG. 6, the network home appliance search section 26 has a state information receiving section 40 for receiving state information such as the operation state of the network home appliance 2 and the network; a state information accumulation section 41 for storing the received state information in association with the IP addresses of the network home appliance 2 and relay device 3; and a network home appliance control section 42. The state information receiving section 40 receives state information of each network home appliance 2 for each of a tunneling domain (the home network 1 or the relay device 3) which houses the network home appliance 2. The state information receiving section 40 may receive the state information by querying the state for each domain either at predetermined intervals or on receipt of a reference request for each domain. In the former method, for example, a power ON/OFF state of each network home appliance 2 is queried every minute for each relay device registered in the relay device address 16a.

The state information accumulation section 41 stores the state information of each network home appliance 2 in association with the network home appliance 2 and the relay device 3. In this case, the obtained state information includes at least one of an operation state, a usage state, location information, property information, information maintained at a node (the relay device 3 or the network home appliance 2), and information useful for identifying the node.

The operation state includes at least one of a power state, a network connection state and a communication state. The usage state includes at least one of user information, operation time information and load information. The location information includes at least one of a geographical location, coordinate information, a zip code, a room number and the like. The property information includes at least one of a type, functions, a shape, colors, device information, software information and administrator information of the node.

Additionally the model determined by the network home appliance model identification section 21 is individually stored as state information. The state information receiving section 40 identifies information obtainable from the network home appliance 2 based on the model information, and obtains required information in a format appropriate for the obtainable information.

The network home appliance search section 26 is provided with a connection request authentication section 27 for connecting to the user management server 30 to authenticate the user performing the search or issuing the connection request, and permit the search or the connection request. In the case of a user's home network (with the relay device 3), for example, only specific users permitted to connect to this home network are allowed to search and connect. If the connection request authentication section 27 gives a positive result, the network home appliance search section 26 accesses the state information accumulation section 41 and the address storage section 16, and searches for the address of a desired network home appliance 2 (and identifies the relay device 3).

Figure 7:
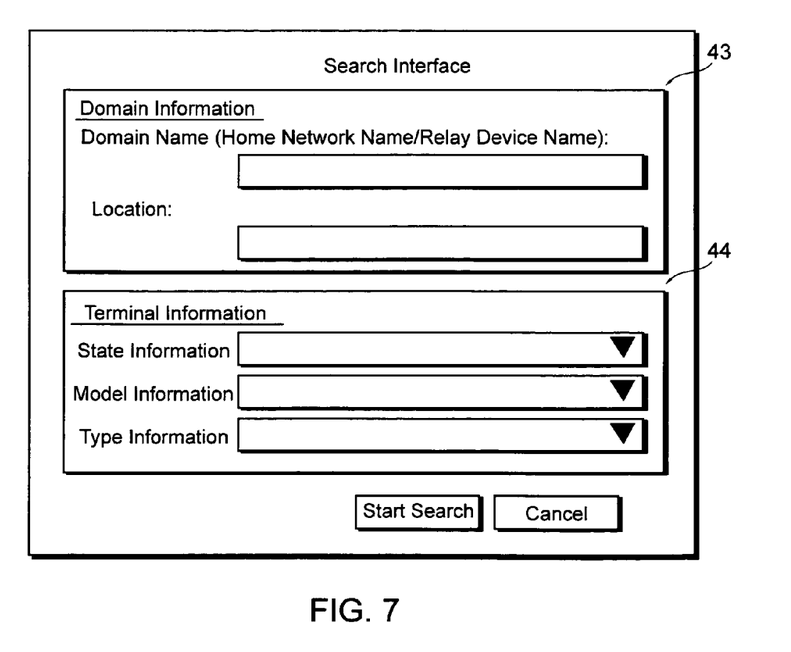
FIG. 7 is a diagram showing an example of a search screen.
Figure 8:
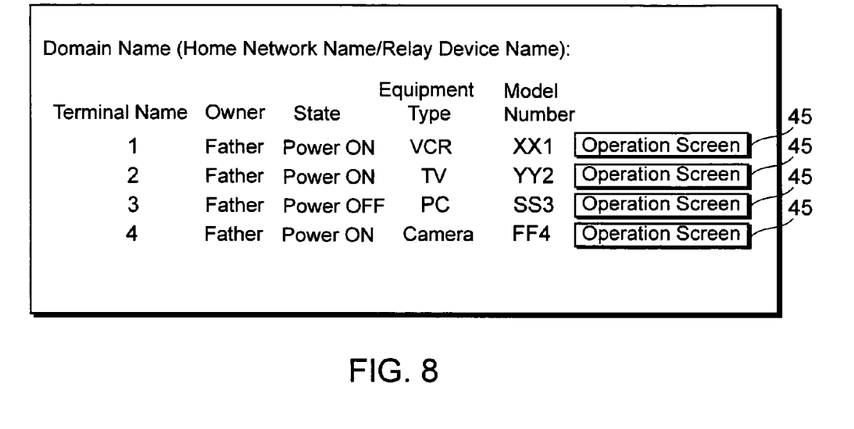
FIG. 8 is a diagram showing an example of a list display of search results for the relay device.

When a user searches for the relay device 3 of the user's own home network from the external system using a personal computer, for example, the search results may be displayed as a list of all network home appliances 2, as well as their states, which are connected to the relay device 3. FIG. 7 is an example of a search screen and FIG. 8 is an example of a list display of search results for the relay device 3/home network 1. In the example of a search interface shown in FIG. 7, there are provided an entry field 43 for searching for the relay device 3 and an entry field 44 for searching for the network home appliance 2, and they are programmed to enable searching from either one of them.

In the example of a search result list display shown in FIG. 8, each terminal (network home appliance 2) connected to the relay device 3 is listed together with the owner, state, type and model information. Further by pressing an operation screen display button indicated with 45 in the figure, the network home appliance control section 42 is activated and an operation screen (not shown) is displayed according to the type and model of the terminal.

Figure 9:
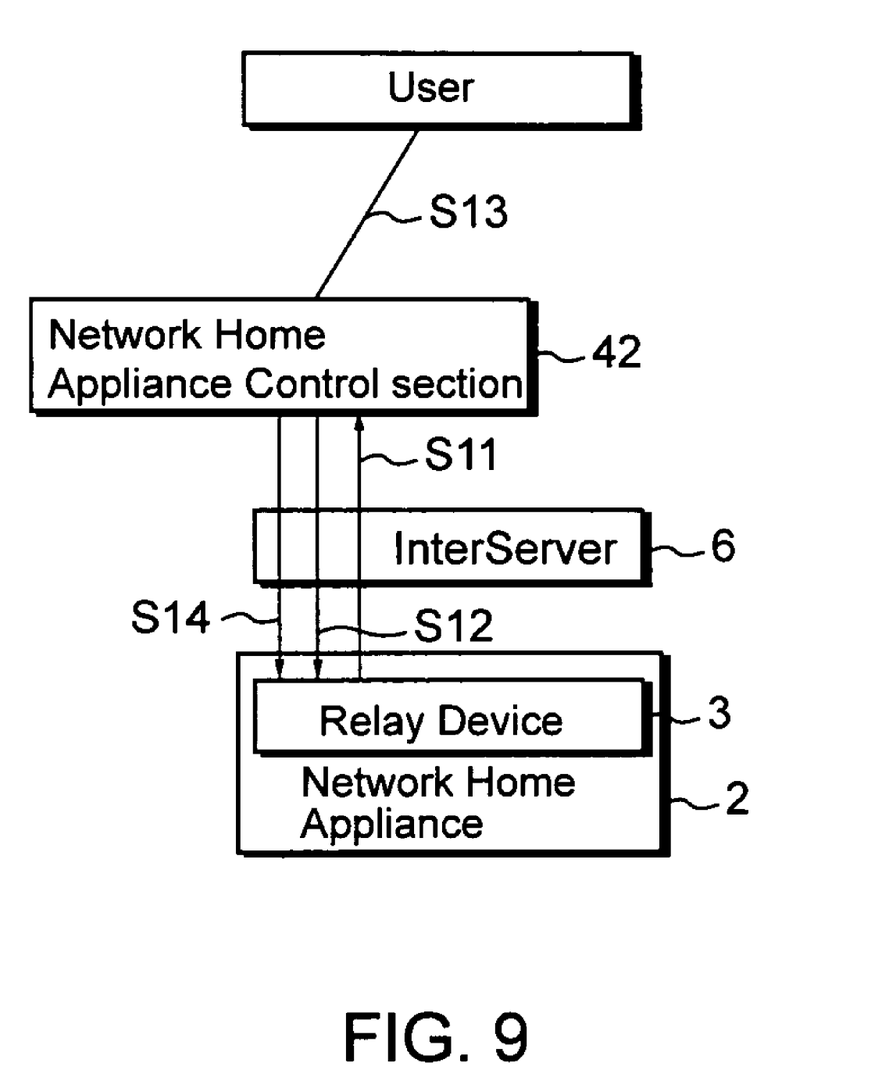
FIG. 9 is a diagram showing a control concept of a network home appliance control section.

FIG. 9 is a conceptual diagram of a control by the network home appliance control section 42.

First, the network home appliance 2 notifies its operation state in response to a request from the state information receiving section 40 (step S11) while the relay device 3 is connected to the InterServer 6 through a tunneling session. At this point, it may be configured so that the operation state cannot be obtained unless the network home appliance 2 logs in the network home appliance control section 42. The obtained operation state is accumulated and updated in the state information accumulation section 41 on a regular basis (step S12).

Next, the user of the network home appliance 2 logs in from outside using his ID and password, and identifies a terminal to control from the list as described above to activate the network home appliance control section 42 (step S13). The network home appliance control section 42 processes all instructions on the server side and sends appropriate commands to the terminal equipment to control it.

Also the user may select a terminal name from the list to thereby connect to the selected network home appliance 2 via routing. Further, the user may enter a specific state as a search condition and, if a terminal with that condition is found, may connect to the terminal directly. Note that the connection to the terminal is made after a tunneling connection is established even when the user searches for the terminal from outside of the home network via the Web server without using the tunneling connection through the InterServer 6.

Here, the "tunneling" refers to technologies for connecting networks (router) of IPv4 and IPv6 through an IPv4 network, and more specifically refers to technologies for tunneling to terminate multiple equipment which belong to different networks with a VPN (virtual private network). In this embodiment, IPv4 packets communicated among equipment are capsulated with IPv4.

In practice, the respective components 10-42 of the relay device 3 and InterServer 6 are configured by use of hard disks in a computer system and computer software programs installed in the areas, as well as CPU, RAM, and peripheral equipment such as other input and output device for controlling the hard disks to read the programs.

Additionally the relay device 3 preferably comprises one computer system which includes each network home appliance 2, and the InterServer 6 preferably comprises a plurality of computer systems which are connected to one another for load sharing. For example, the network home appliance search section 26 for managing the states of the relay device 3, network home appliance 2 and home network 1 preferably is configured in a server with a dedicated transmission interface and a control section. This is because load sharing may be needed to address an immense number of predicted sessions managing ON/OFF and other states of each device. Also when one InterServer 6 processes relay devices and network home appliances from different manufacturers, there may be provided a plurality of the capsulating processing sections 18, command setup sections 22, filter sections 23 and the like.

Hereinafter, operations of the relay device 3 and InterServer 6 are described below in accordance with communication examples shown in FIG. 10 and later figures.

Figure 10:
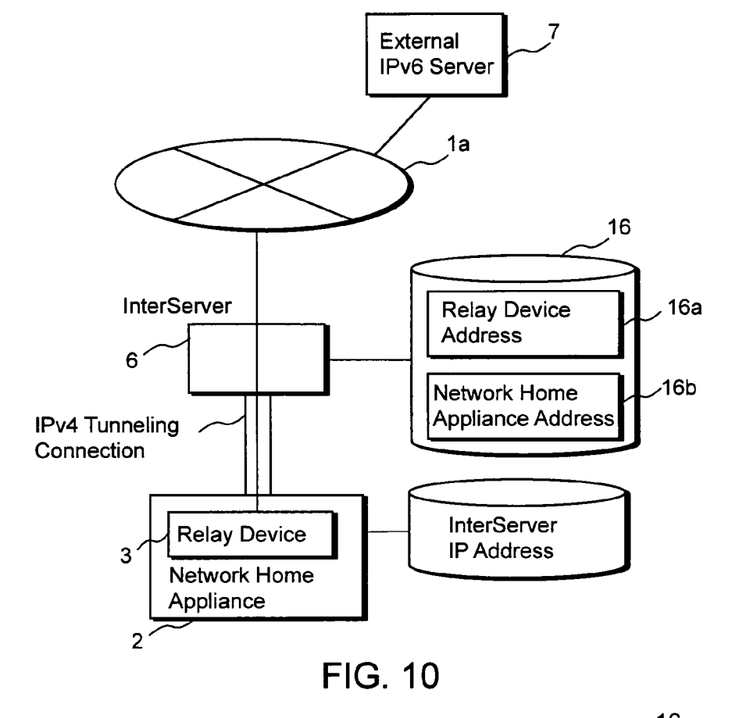
FIG. 10 is a function diagram showing a communication example in the present embodiment.

FIG. 10 shows communications via the InterServer 6 between a network home appliance 2 of a home network connected to a relay device 3, and another terminal with no relay device 3 provided.

This diagram shows a communication session established with the relay device 3 within a tunneling connection by the tunneling session establishing sections 17 and 11 based on the address of the InterServer 6, the IP address assigned to the relay device 3, and the address of the network home appliance 2.

Once a tunneling communication session is established, packets to the network home appliance 2 are transmitted after being capsulated in IPv4 packets for the relay device 3 by the capsulating processing section 18. In the relay device 3, the capsulating processing section 12 decapsulates those packets while the routing processing section 13 processes routing to the network home appliance 2 based on its address included in the packets. Thus a connection to the network home appliance 2 in a home network at home, for example, may be activated by an external IPv6 server 7.

If the network home appliance 2 is, for example, a home security camera, this camera may be activated and controlled even when the home owner is outside of home through the InterServer 6 and the relay device 3 by connecting the home owner's PDA and the like to a nearest IPv6 network.

Also in this example, the network home appliance model identification section 21, the command setup section 22 and the filter section 23 provided in the InterServer 6 function according to the model of the network home appliance 2.

The network home appliance model identification section 21 is configured to determine the model of the network home appliance 2 and a network environment based on, for example, the address of the relay device 3 or the network home appliance 2 (address itself or information associated with the address). In this embodiment, the network home appliance 2, the relay device 3 and the InterServer 6 are assumed to be produced by the same manufacturer or under a unified standard, wherein the model type or the network environment may be easily determined from the IP address assigned to (or generated for) the network home appliance 2 or the relay device 3 connected to the network home appliance 2 by presetting a certain set of rules to the IP address.

When a special command is required to manage the network home appliance 2, the command setup section 22 coverts a command included in the communication from the IPv6 server 7 to a command specific to the model. For example, commands may be generated from a message described in the HTML language. Alternatively, an instruction from one IPv6 server 7 may be converted to a plurality of commands for a plurality of network home appliances 2.

Moreover, the filter section 23 has a function to filter packets passing through the InterServer 6 based on predetermined rules. These filtering rules may be predetermined, for example, at a connection destination relay device 3, each network home appliance 2 or each network. The communication session disconnection section 24 is configured to disconnect communication sessions if the network home appliance model identification section 21 does not recognize predetermined models or network environments, or if the filter section 23 returns a negative result. In addition, if a connection destination network home appliance cannot be connected due to its power OFF state and the like, and if there are any alternative IPv6 equipment connected to the same relay device, communication sessions may still be routed to those other network home appliances based on their model or type information.

Figure 11:
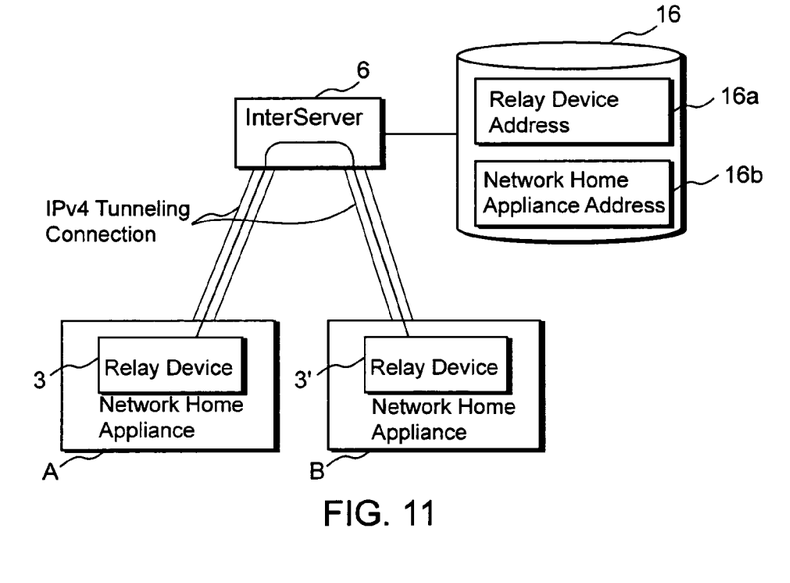
FIG. 11 is a function diagram showing another communication example in the present embodiment.

FIG. 11 is an example of a connection via the InterServer 6 between IPv6 home networks which have a relay device 3 and 3', respectively. Each home network is connected with a network home appliance A or a network home appliance B, and communications between these two network home appliances A and B are described below.

Again in this case, the InterServer 6 stores addresses or other information of the network home appliances A and B in association with the IPv4 addresses of the respective relay devices 3.

When a connection from one network home appliance A to the other network home appliance B is requested, first a communication session within the tunnel connection is established between the relay device 3 of the network home appliance A and the InterServer 6. Next the relay device 3' is identified based on the address of the network home appliance B included in the packets, to thereby establish a tunneling communication session between the InterServer 6 and the relay device 3'. Then the relay device 3' performs an intra-network routing based on the IPv6 address of the network home appliance B included in the packets.

In this way, the two network home appliances may communicate with each other through the InterServer 6.

In the above case, the address of the connection destination network home appliance may be unknown when communications between the two network home appliances are desired. In this situation, the user who is originating the connection accesses the InterServer 6 and activates the network home appliance search section 26. During this time, for security reasons, the connection request authentication section 27 authenticates this user and determines if the connection request is legitimate to permit searches for the connection destination network home appliance and its user. If the desired network home appliance was successfully identified, a tunnel communication session is established based on the IPv6 address of the desired network home appliance.

According to the above structure, all communications related to the network home appliance 2 are performed through the InterServer 6 regardless of their carriers and ISP's, enabling an owner of the InterServer 6 to freely configure and control the network home appliance 2 or the server 7 on his home or workplace network. Thus all problems related to conventional home routing, security and individual identification of the network home appliance 2 in the private network from servers on the Internet can be solved, and extremely open and yet closed networks can be realized.

Normally the owner of the InterServer 6 is assumed to be a manufacturer of the network home appliance 2. Therefore, this manufacturer may create added values for users utilizing the Internet by preparing its own IPv6 equipment lineup compatible with the InterServer 6.

Next, sign-up of the network home appliance 2 is described below in accordance with FIG. 12.

In the above description, the IP address of the network home appliance 2 is received from the relay device 3 side. In practice, however, there are various other possible methods. Also the manufacturers and/or the owner of the InterServer 6 may be interested in obtaining information on the owner (user) of the network home appliance 2. Furthermore, the address of the network home appliance 2 may in some case be: a factory default fixed IPx6 address written into the RAM of the network home appliance 2; or determined according to the IPv6 prefix of a connecting relay device 3.

Figure 12:
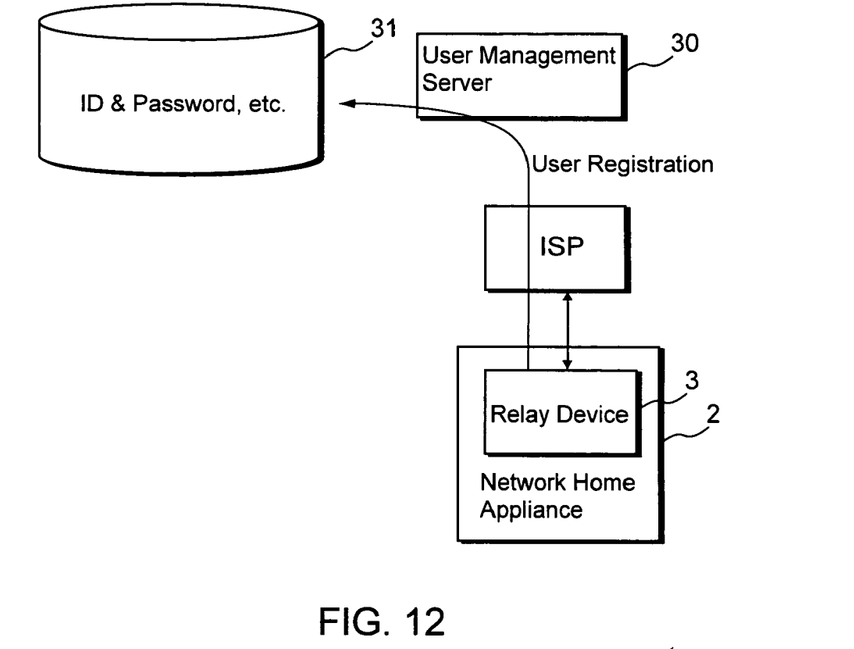
FIG. 12 is a diagram showing a setup example of the relay device or a network home appliance.

Therefore in the present embodiment, as shown in FIG. 12, the user of the network home appliance 2 or the relay device 3 should first connect to the user management server 30 to perform a user registration. The user registration may be done by using the network home appliance 2 through the relay device 3, or using IPv4-communication-enabled equipment such as an existing personal computer or the like. In this embodiment, described is the case wherein the network home appliance 2 and the relay device 3 are used. Also in the following, the network home appliance 2 is a terminal incapable of establishing a network connection by itself, and the address of the network home appliance 2 is generated as a virtual address by the relay device 3 using a MAC address of the network home appliance 2.

When the user first connects the network home appliance 2 to the relay device 3, the relay device 3 connects to the user management server 30 via the ISP/carrier. Accordingly, information required for a tunneling connection from the relay device 3 to the InterServer 6 is passed to the user management server 30. The user also passes, to the user management server 30 through the relay device 3, information about the user, identification of the relay device 3 or the network home appliance 2, the model of the network home appliance 2, the network 1, billing and the like. In the present example, the relay device 3 and each user are issued with an ID and a password, in association with which information of the relay device 3 and each user are registered in the user information management DB 31. Note that information required for the registration is not limited to the above and that the above and other information may not be required if the password and billing information are unnecessary.

The above-described user management server 30 may be connected to the InterServer 6 or may be independently provided on the Internet.

Figure 13:
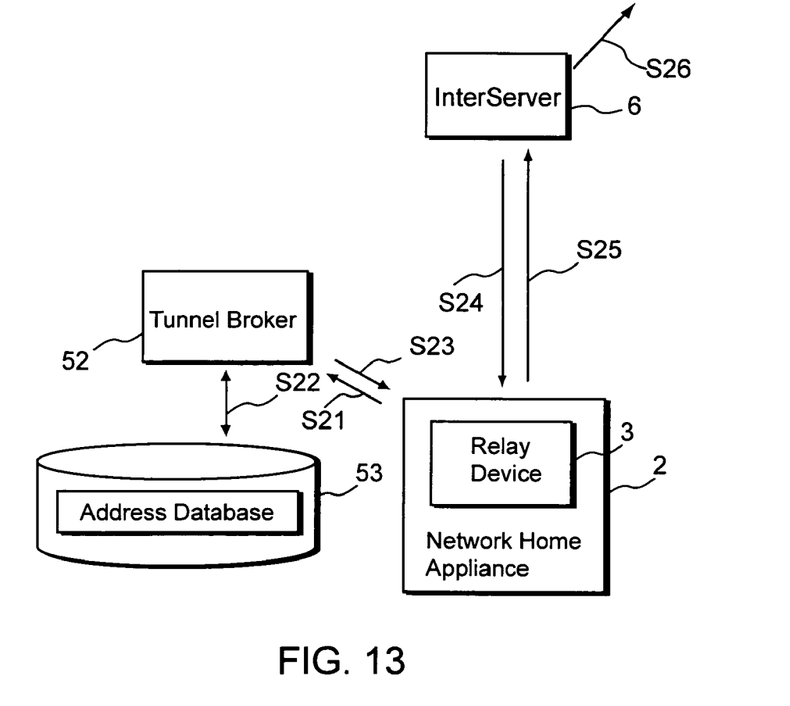
FIG. 13 is a diagram showing a tunneling connection example between the relay device and the InterServer.

FIG. 13 shows an embodiment of a specific method for establishing a tunneling connection and a communication session within the tunneling connection. Each of the reference numerals/symbols S21-S26 in this figure corresponds to each of the following steps S21-S26.

In this embodiment, the relay device 3 stores the IPv4 address of the InterServer 6 therein: this address may be stored in the RAM by the manufacturer as a factory default, or may be received from another server and the like upon an actual tunneling connection. The former may be employed if there is a single InterServer 6, and the latter may be more efficient if there are a plurality of InterServers 6.

The diagram in FIG. 13 is an example of the latter, and a tunnel broker 52 is provided accordingly. In this case, an IPv4 global address of the tunnel broker 52 is preconfigured in a tunnel broker address storage section of the relay device 3. The relay device 3 is also preconfigured with the ID and the password (if required) described above.

The relay device 3 first connects to the tunnel broker 52 (step S21). The tunnel broker 52 selects from an address database 53 a destination InterServer 6 to which a tunnel connection is to be established (step S22), and notifies the relay device 3 of the IPv4 address of the InterServer 6 (step S23). In this manner, the relay device 3 can identify the InterServer 6 and establish the tunneling session (steps S24 and S25). That is, the tunneling server performs authentication and IP address assignment based on the authentication to establish the tunneling connection, and establishes a TCP/IP connection with tunneling.

Next, the InterServer 6 announces to other InterServers 6 about this routing to the relay device 3 and/or the network home appliance 2 with the established tunneling connection (step S26). In some cases, all of the routing to the relay device 3 and/or the network home appliance 2 may be established through the InterSever 6.

According to such a structure, if there are multiple InterServers 6, the establishment of the tunneling connection may be ensured by using one of them.

It is to be understood that the embodiment heretofore described is no more than one embodiment of the present invention, and that various changes and modifications can be made, without departing from the scope and spirit of the present invention.

For example, the tunneling connection may be established from both the relay device 3 and the InterServer 6 in the above one embodiment. However, the tunneling connection may be generally established only from the relay device 3 in actual commercial services. This is due to a rarity of IPv4 fixed IP services. This is because routing is impossible if the IPv4 session itself is actually disconnected: in this case, the configuration remains intact once the tunneling (in practice the IPv4 connection itself) is established until the IPv4 session is disconnected, and the next IPv4 of the relay device 3 is seldom the same as before.

Further, the above one embodiment illustrated with the first protocol as IPv4 and the second protocol as IPv4 is not intended to limit to these protocols. The first protocol may be IPv6. Also both the first and the second protocols may be IPv6. Furthermore, both may be other than the above protocols.

In the above one embodiment, the relay device 3 is integrally provided with each network home appliance 2, but it may be separately provided and one relay device may be shared by a plurality of network home appliances. Also the network home appliance and the relay device may be connected via LAN.

Having described the invention, the above examples are given to illustrate specific applications of the invention including the best mode now known to perform the invention. These specific examples are not intended to limit the scope of the invention described in this application.

What is claimed is:

1. An Internet connection system comprising:

a client device and a relay device located within a private TCP/IP network, and a server located on the Internet, wherein the client device is a home appliance that is communicable with the relay device but cannot independently connect to the Internet, the relay device is installed within the client device, and the server communicates with the relay device through the Internet;

and wherein said server on the Internet comprises:

a tunneling establishing section coupled to the relay device via a TCP/IP session through a tunneling connection over the Internet, wherein an IP address for the tunneling connection is assigned to said client device;

a client device management section in communication with the client device through the relay device or the tunneling connection;

a model identification section with a comparator whose output indicates if the client device is of a predetermined model or if the relay device is of a predetermined model;

a command conversion section in communication with a user via the Internet, whereby in response to a an instruction for controlling said client device received from the user, the command conversion section converts the instruction to a command in a predetermined format specific to the predetermined model and ready to cause an operation of said instruction in the client device upon decapsulation, if the model identification section output indicates that the client device or the relay device is of the predetermined model, a server packet processor in communication with the command conversion section that encapsulates a command packet to be sent to a client device, said command packet including said command, the server packet processor further decapsulating a packet received via the Internet; and a routing section in communication with the server packet processor and the relay device, the routing section routing packets according to an address in each packet, based on management at the client device management section; and wherein said relay device comprises:

a control section in communication with the server on the Internet that receives said command packet which includes said command, a server address storage section comprising a global address of said server located on the Internet;

a tunneling establishing section coupled to the server on the Internet via the TCP/IP session through the tunneling connection over the Internet, wherein the tunneling connection over the Internet is established using the global address of the server; and a relay packet processor in communication with the tunneling establishing section that decapsulates the command packet for delivery to the control section, said command packet including said command, the relay packet processor further encapsulating a packet to be sent to the server through the tunneling connection and routing the packet to the server.

2. The Internet connection system of claim 1, wherein said relay device further comprises:
   a broker server address storage section comprising an address of a tunneling broker server located on the Internet; and
   a server address obtaining section in communication with the tunneling broker server, whereby the server address obtaining section receives a global address of the server on the Internet from the tunneling broker server.

3. The Internet connection system of claim 1, wherein said server further comprises:
   a communication session disconnection section coupled to the model identification section and at least one of the tunneling establishing section, the packet processing section, and the routing device, wherein in response to an indication from the model identification section that the client device or the relay device is not of the predetermined model, the communication session disconnection section severs the tunneling connection or limits packet transmissions.

4. The Internet connection system of claim 1, wherein the client device is peripheral equipment, which is communicable with the relay device but cannot independently connect to the Internet.

5. The Internet connection system of claim 1, wherein said server further comprises:
   a network type identification section coupled to a first network environment and operable to determine if the first network environment is of a predetermined type, wherein the first network environment includes the client device or the relay device.

6. The Internet connection system of claim 5, wherein said server further comprises:
   a communication session disconnection section coupled to the model identification section and at least one of the tunneling establishing section, the packet processing section, and the routing device, wherein in response to an indication from the model identification section that the client device or the relay device is not of the predetermined model, the communication session disconnection section severs the tunneling connection or limits packet transmissions.

7. The Internet connection system of claim 1, wherein said server further comprises:
   a state information obtaining section coupled to at least one of the client device and the relay device, wherein the state information obtaining section receives at least one of an operation state, a usage state and location information of the client device or the relay device.

* * * * *